United States Patent
Lu et al.

(10) Patent No.: US 10,562,704 B2
(45) Date of Patent: Feb. 18, 2020

(54) SHEET STORAGE DEVICE AND CONTROLLING METHOD THEREOF

(71) Applicants: BOE Technology Group Co., Ltd., Beijing (CN); Hefei Xinsheng Optoelectronics Technology Co., Ltd., Hefei (CN)

(72) Inventors: Guanquan Lu, Beijing (CN); Junqi Han, Beijing (CN); Rentan Chen, Beijing (CN)

(73) Assignees: BOE TECHNOLOGY GROUP CO., LTD., Beijing (CN); HEFEI XINSHENG OPTOELECTRONICS TECHNOLOGY CO., LTD., Anhui (CN)

( * ) Notice: Subject to any disclaimer, the term of this patent is extended or adjusted under 35 U.S.C. 154(b) by 179 days.

(21) Appl. No.: 15/789,498

(22) Filed: Oct. 20, 2017

(65) Prior Publication Data

US 2018/0251298 A1 Sep. 6, 2018

(30) Foreign Application Priority Data

Mar. 1, 2017 (CN) .......................... 2017 1 0117480

(51) Int. Cl.
*B65G 1/02* (2006.01)
*A47F 5/00* (2006.01)

(52) U.S. Cl.
CPC ............ *B65G 1/026* (2013.01); *A47F 5/0081* (2013.01); *B65G 2201/022* (2013.01); *B65G 2203/0283* (2013.01)

(58) Field of Classification Search
CPC .............. B65G 1/026; B65G 2201/022; B65G 2203/0283; A47F 5/0081; F16M 13/00;
(Continued)

(56) References Cited

U.S. PATENT DOCUMENTS 4,600,231 A * 7/1986 Sickles .............. H05K 13/0069
206/707
4,761,044 A * 8/1988 Akama ................ H05K 7/1418
312/110
(Continued)

FOREIGN PATENT DOCUMENTS

CN 1847108 A 10/2006
CN 203332663 U 12/2013
(Continued)

OTHER PUBLICATIONS

English translation of chinese publication CN-203781022-U to Dong Tiansong (Year: 2014).*
(Continued)

*Primary Examiner* — Ko H Chan
(74) *Attorney, Agent, or Firm* — Westman, Champlin & Koehler, P.A.

(57) ABSTRACT

Disclosed are a sheet storage device and a controlling method thereof the sheet storage device including a storage unit, an adjustment assembly and a control portion. The storage unit comprises a mounting frame, a plurality of support brackets configured to place a plurality of sheets and two shiftable mechanisms mounted on the mounting frame and spaced apart in an upper and lower direction. The support brackets are mounted between the two shiftable mechanisms and spaced apart in a position shifting direction of the two shiftable mechanisms, and two adjacent support brackets thereof are constructed to define a storage space for placing the sheet. Each support bracket is configured such that upper and lower ends of the support bracket are adapted to be shiftably engaged with the two shiftable mechanisms respectively, so as to adjust the distance between the two adjacent support brackets. The adjustment assembly is engaged with at least one of two adjacent support brackets to adjust the size of the storage space. The control portion is
(Continued)

connected to the adjustment assembly to control the adjustment assembly according to received user instructions.

14 Claims, 8 Drawing Sheets

(58) Field of Classification Search
CPC ........... H01L 21/6734; H01L 21/67373; H01L 21/67383
See application file for complete search history.

(56) References Cited

U.S. PATENT DOCUMENTS

| | | | | |
|---|---|---|---|---|
| 6,155,426 | A * | 12/2000 | Matsuda | H05K 13/0069 206/708 |
| 6,186,344 | B1 * | 2/2001 | Park | H01L 21/6734 211/41.1 |
| 7,246,708 | B2 * | 7/2007 | Chuang | A47B 57/10 211/41.18 |
| 9,605,797 | B2 * | 3/2017 | Han | F16M 13/00 |
| 9,656,797 | B2 * | 5/2017 | Hong | G02F 1/1303 |
| 9,691,647 | B2 * | 6/2017 | Wang | H01L 21/6734 |
| 9,897,381 | B2 * | 2/2018 | Liu | F27D 5/00 |
| 2003/0132176 | A1 * | 7/2003 | Takano | H01L 21/67309 211/41.1 |
| 2006/0226093 | A1 | 10/2006 | Cho et al. | |
| 2006/0226094 | A1 * | 10/2006 | Cho | B65D 85/48 211/41.18 |
| 2006/0231515 | A1 * | 10/2006 | Chou | H01L 21/67303 211/41.18 |
| 2008/0258587 | A1 * | 10/2008 | Mayuzumi | B65D 21/08 312/111 |
| 2016/0135592 | A1 | 5/2016 | Hong et al. | |

FOREIGN PATENT DOCUMENTS

| | | |
|---|---|---|
| CN | 104309946 A | 1/2015 |
| KR | 10-0977593 B1 | 8/2010 |
| KR | 20140100726 A | 8/2014 |

OTHER PUBLICATIONS

Derwent document of chinese publication CN 203781022 U to Dong Tiansong, Aug. 20, 2014 (Year: 2014).*
First Office Action, including Search Report, for Chinese Patent Application No. 201710117480.3, dated Jan. 24, 2018, 14 pages.

* cited by examiner

SHEET STORAGE DEVICE AND CONTROLLING METHOD THEREOF

CROSS-REFERENCE TO RELATED APPLICATION

This application claims the benefit of Chinese Patent Application No. CN201710117480.3 filed on Mar. 1, 2017 in the State Intellectual Property Office of China, the whole disclosure of which is incorporated herein by reference.

BACKGROUND OF THE INVENTION

Field of the Invention

At least one embodiment of the present disclosure relates to a technical field of a liquid crystal display, and more particularly to a sheet storage device and a controlling method thereof.

Description of the Related Art

When a panel storage device is required to store panels of different sizes used in a liquid crystal display, the size of a storage space for storing the panels is adjusted by shifting positions of the panel storage device, so that the size of the storage space is matched with the size of the panels to be stored. Position shifting of the panel storage device in the relevant technology requires manual operation, which wastes manpower and has low efficiency. Meanwhile, such manual operation may cause quality accidents.

SUMMARY OF THE INVENTION

The embodiments of the present disclosure are intended to address at least one of the technical problems and other aspects of the related technology.

According to one aspect of the present disclosure, there is provided a sheet storage device, of which position shifting is automatically performed.

According to an exemplary embodiment of the present disclosure, the sheet storage device comprises a storage unit, an adjustment assembly and a control portion. The storage unit comprises: a mounting frame; a plurality of support brackets configured to place a plurality of sheets; and two shiftable mechanisms mounted on the mounting frame and spaced apart in an upper and lower direction. The a plurality of support brackets are mounted between the two shiftable mechanisms and spaced apart in a position shifting direction of the two shiftable mechanisms, and two adjacent support brackets thereof are constructed to define a storage space for placing the sheets. Each support bracket is configured such that upper and lower ends of the support bracket are adapted to be shiftably engaged with the two shiftable mechanisms respectively, so as to adjust the distance between the two adjacent support brackets. The adjustment assembly is adapted to be engaged with at least one of two adjacent support brackets to adjust the size of the storage space, and the control portion is connected to the adjustment assembly to control the adjustment assembly according to received user instructions.

According to another exemplary embodiment of the present disclosure, the adjustment assembly comprises: an upper adjustment block configured to drive the support brackets to move in a first direction parallel to the position shifting direction; and a lower adjustment block configured to drive the support brackets to move up and down.

According to another exemplary embodiment of the present disclosure, the upper adjustment block and the lower adjustment block are located on upper and lower sides of the support bracket, respectively, and the control portion is configured to control the lower adjustment block to be engaged with the lower end of the support bracket and to push the support bracket upwardly so that the upper end of the support bracket is engaged with the upper adjustment block, and to control the upper adjustment block and the lower adjustment block to simultaneously move the support bracket in the first direction to adjust the size of the storage space.

According to another exemplary embodiment of the present disclosure, the sheet storage device further comprises a plurality of driving devices configured to drive the upper adjustment block and the lower adjustment block to move, respectively, according to user instructions received from the control portion.

According to another exemplary embodiment of the present disclosure, the upper adjustment block is formed with a first receiving recess which is engaged with the upper end of the support bracket.

According to another exemplary embodiment of the present disclosure, the lower adjustment block is formed with a second receiving recess which is engaged with the lower end of the support bracket.

According to another exemplary embodiment of the present disclosure, each shiftable mechanism comprises two shiftable arms disposed to be spaced apart in a front and rear direction perpendicular to the position shifting direction. Each support bracket comprises two support rods disposed to be spaced apart in the front and rear direction, and upper and lower ends of each support rod are respectively movably engaged with corresponding upper and lower shiftable arms.

According to another exemplary embodiment of the present disclosure, each of the shiftable arms is formed with a plurality of positioning holes. Two adjacent positioning holes are communicated with each other through a communicating slot, the width of the communication slot being smaller than the diameter of the positioning holes, and positioning holes in two shiftable arms are aligned in the upper and lower direction one to one.

According to another exemplary embodiment of the present disclosure, each support rod comprises a first engaging portion, a second engaging portion, a connecting portion, a third engaging portion and a fourth engaging portion connected successively. The first engaging portion and the third engaging portion are adapted to be engaged with two positioning holes in the two shiftable arms aligned in the upper and lower direction respectively, so as to hold the support bracket in a fixed position, and the second engaging portion and the fourth engaging portion are adapted to slide through communicating slots in the two shiftable arms aligned in the upper and lower direction respectively, so as to shift positions of the support bracket.

According to another exemplary embodiment of the present disclosure, the plurality of driving devices comprise: a first driving device mounted on a lower portion of the mounting frame and configured to cooperate with the lower adjustment block to drive the first engaging portion and the third engaging portion of the support rod to disengage from corresponding positioning holes, and a second driving device mounted on an upper portion of the mounting frame and configured to cooperate with the upper adjustment block to drive the second engaging portion and the fourth engaging portion of the support rod to move in corresponding communication slots in the first direction.

According to another exemplary embodiment of the present disclosure, the plurality of driving devices further comprise a third driving device mounted on a lower portion of the mounting frame and configured to cooperate with the lower adjustment block and the second driving device, so as to drive the second engaging portion and the fourth engaging portion of the support rod to move in corresponding communication slots in the first direction.

According to another exemplary embodiment of the present disclosure, each of the first driving device, the second driving device and the third driving device comprises a motor, a pneumatic driving mechanism, or an electromagnetic coupling mechanism mounted on the mounting frame.

According to another aspect of the present disclosure, there is provided a method of controlling the sheet storage device according to the above embodiments. The method comprises the steps of: providing the storage unit; and controlling the adjustment assembly to adjust the size of the storage space through the control portion.

According to an exemplary embodiment of the present disclosure, the adjustment assembly comprises an upper adjustment block and a lower adjustment block, and the step of controlling the adjustment assembly to adjust the size of the storage space through the control portion comprises the following steps:

controlling the upper adjustment block and the lower adjustment block to move in a first direction parallel to the position shifting direction by the control portion so that the upper adjustment block and the lower adjustment block move to the upper and lower sides of the support brackets;

controlling the lower adjustment block to move up and down by the control portion so that the lower adjustment block is engaged with the lower end of the support bracket;

controlling the lower adjustment block to push the support bracket upwardly by the control portion so that the upper end of the support bracket engages with the upper adjustment block, and then controlling the upper adjustment block and the lower adjustment block to move in the first direction to drive the support bracket to move, so as to adjust the size of the storage space.

According to another exemplary embodiment of the present disclosure, the control portion drives the upper adjustment block and the lower adjustment block by a driving device.

BRIEF DESCRIPTION OF THE DRAWINGS

The above and/or additional aspects and advantages of the present disclosure will become apparent and readily appreciated from the following description of the embodiments taken in conjunction with the accompanying drawings in which.

DETAILED DESCRIPTION OF PREFERRED EMBODIMENTS OF THE INVENTION

Figure 1:
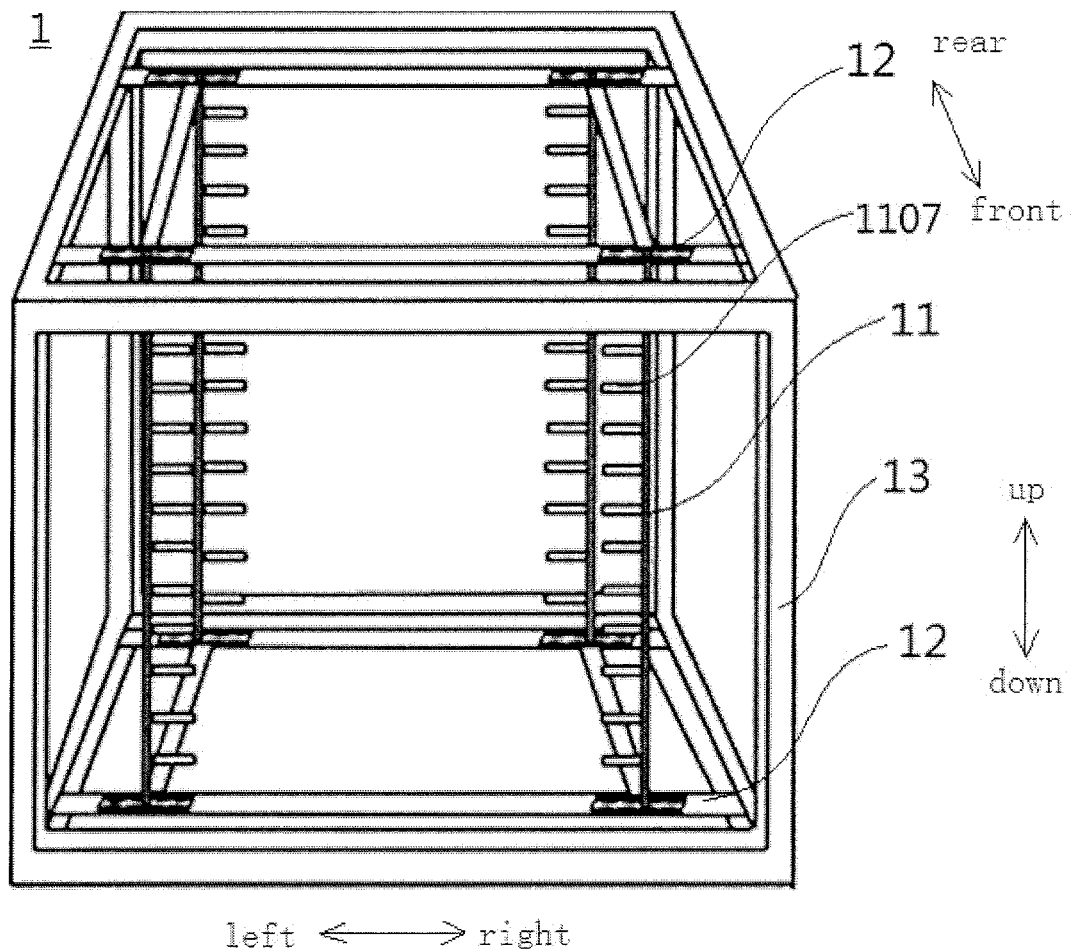
FIG. 1 is a schematic view of a storage unit according to an embodiment of the present disclosure.

Hereinafter, embodiments of the present disclosure, examples of which are shown in the accompanying drawings, are described in detail, through which like or similar reference numerals refer to like or similar elements or elements having the same or similar functions. The embodiments described below with reference to the accompanying drawings are illustrative only, just for the purpose of explaining the present disclosure, and are not to be construed as limiting the present disclosure.

In the description of the present disclosure, it should be understood that orientation or position relationship defined by the terms "length", "width", "upper", "lower", "front", "rear", "left", "right", "top", "bottom", "inner", "outer" and the like, represent orientation or position relationship as shown in the drawings, and are only intended to facilitate and simplify description of the present disclosure, rather than to indicate or to imply that the elements must have a specific orientation, or must be constructed and operated in a particular orientation, and therefore should not be construed as limiting the present disclosure. In addition, features that are defined as "first" or "second" may expressly or implicitly include one or more of the features. In the description of the present disclosure, unless otherwise indicated, the term "plurality" means two or more.

In the description of the present disclosure, it should be understood that the terms "mount", "connect", "communicate", "engage" should be broadly understood unless expressly indicated or defined, for example, it may be a fixed connection or a detachable connection, or an integral connection; or it may also be a mechanical connection or an electrical connection; it may be directly connected or indirectly connected by an intermediate medium, or communication between inside of two components. It will be apparent that those skilled in the art could understand the above terms in the present disclosure to be specific meanings in specific situations.

A sheet storage device 100 according to embodiments of the present disclosure will be described below with reference to FIGS. 1-7.

As shown in FIGS. 1 to 7, the sheet storage device 100 according to an embodiment of the present disclosure includes a storage unit 1, a support platform, an adjustment assembly 2, and a control portion 6. The sheet storage device 100 is adapted to store sheets such as panels of a liquid crystal display. It will be appreciated that the sheet storage device 100 of the present disclosure is also adapted to store other sheets having different sizes.

In an embodiment of the present disclosure, the storage unit 1 comprises a mounting frame 13, a plurality of support brackets 11 and two shiftable mechanisms 12 spaced apart in an upper and lower direction (vertical direction of FIG. 1). The mounting frame 13 is configured to define a receiving space for receiving the support brackets. The plurality of support brackets 11 are configured to place a plurality of sheets. The two shiftable mechanisms 12 are mounted on the mounting frame 13 and spaced apart in the upper and lower direction. The plurality of support brackets 11 are mounted between the two shiftable mechanisms 12 and spaced apart in a position shifting direction (left and right direction of FIG. 1) of the two shiftable mechanisms 12, two adjacent support brackets 11 thereof defining a storage space for storing the sheets. Each support bracket 11 is configured such that an upper end and a lower end of the support bracket are adapted to be shiftably engaged to the two shiftable mechanisms 12 respectively, so as to adjust the distance between the two adjacent support brackets in the position shifting direction. The support platform is configured to mount the storage unit 1 thereon. The adjustment assembly 2 is adapted to be engaged with at least one of the two adjacent support brackets 11 to adjust the size of the storage space. The control portion 6 is connected to the adjustment assembly 2 for controlling the adjustment assembly 2 according to received user instructions.

In the sheet storage device 100 according to an embodiment of the present disclosure, by providing the storage unit 1, the adjustment assembly 2 and connecting the control portion to the adjustment assembly 2 to control an operation of the adjustment assembly 2, the sheet storage device 100 may automatically perform a position shifting with a simple structure. In this way, by automatically adjusting the distance between the two adjacent support brackets, it's possible to store sheets of different sizes such as panels of a liquid crystal display device, to avoid manual operation, improving work efficiency, avoiding accidents due to manual operation, and improving reliability of the sheet storage device 100.

As shown in FIGS. 1 to 7, according to an embodiment of the present disclosure, the sheet storage device 100 may further include a driving device.

Figure 3:
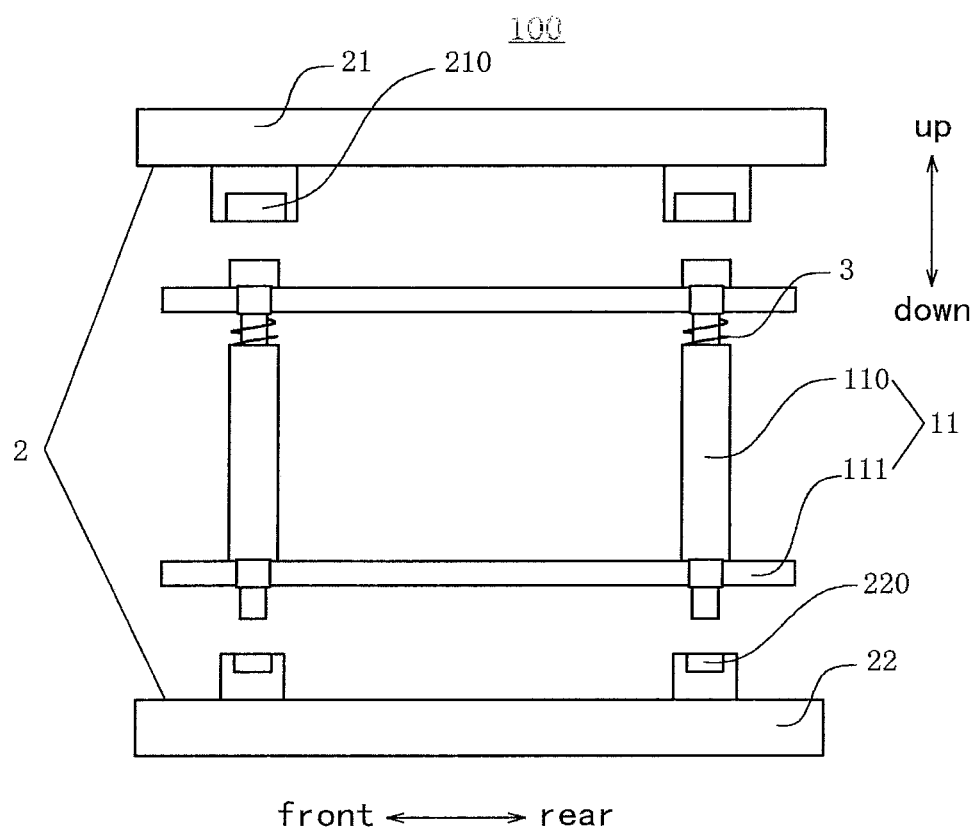
FIG. 3 is a schematic right view showing the operating principle of the sheet storage device according to an embodiment of the present disclosure.
Figure 4:
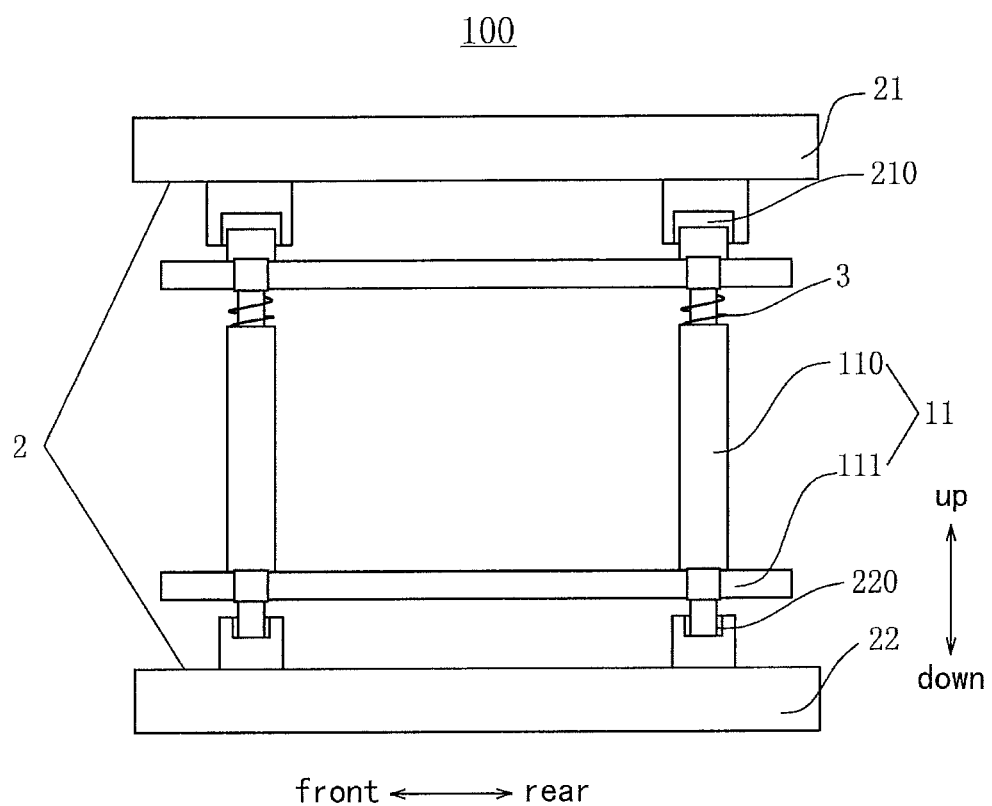
FIG. 4 is a schematic view showing the sheet storage device according to an embodiment of the present disclosure, wherein during position shifting of the sheet storage device, a lower adjustment block is engaged with a support bracket.
Figure 5:
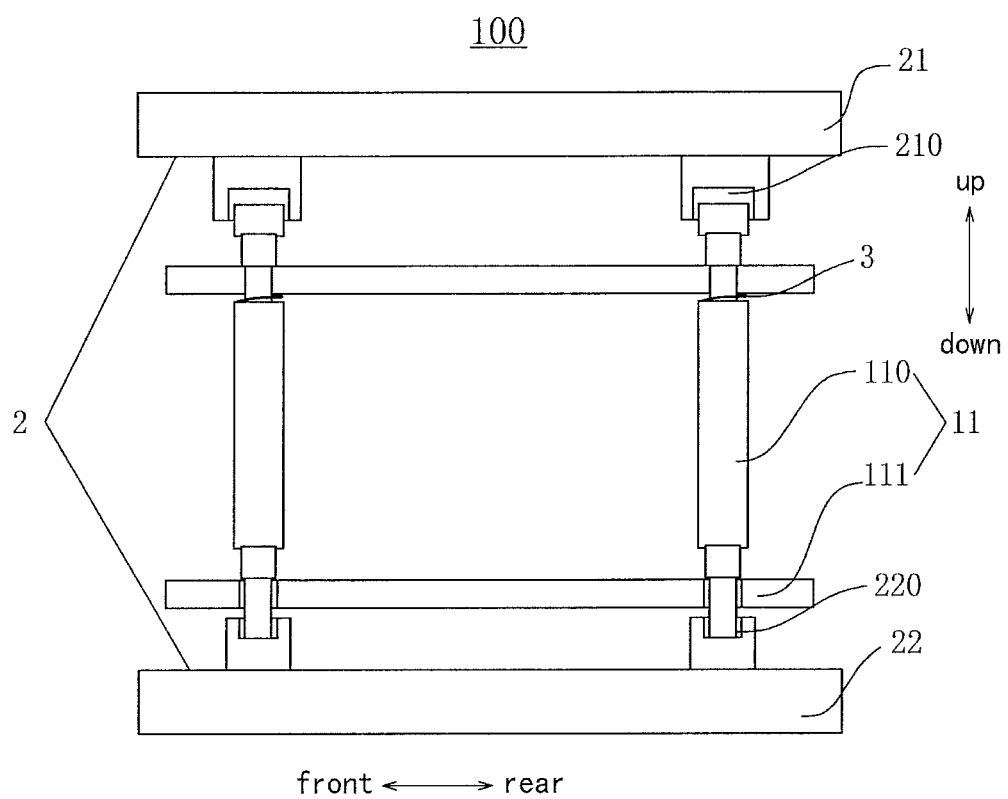
FIG. 5 is a schematic view showing the sheet storage device according to an embodiment of the present disclosure, wherein during position shifting of the sheet storage device, an adjustment assembly drives the support bracket to move.

In an embodiment, the support platform is provided to place the storage unit 1, which includes the plurality of support brackets 11 and the two shiftable mechanisms 12. According to an exemplary embodiment, as shown in FIGS. 3-5, there is provided two support brackets 11 spaced apart in the position shifting direction (for example, left and right direction in FIG. 1) of the two shiftable mechanisms 12 to define the storage space for storing the sheets. According to an exemplary embodiment, as shown in FIG. 3, each support bracket 11 may include two support rods 110, which are spaced apart in a front and rear direction and extend in the upper and lower direction. According to an exemplary embodiment, each support bracket further includes two connecting rods 111 extend in the front and rear direction perpendicular to the position shifting direction and spaced apart from each other in the upper and lower direction perpendicular to the position shifting direction and the front and rear direction. Both ends of each connecting rod 111 are respectively connected to the two supporting rods 110 to improve stability of the supporting bracket 11.

Figure 6:
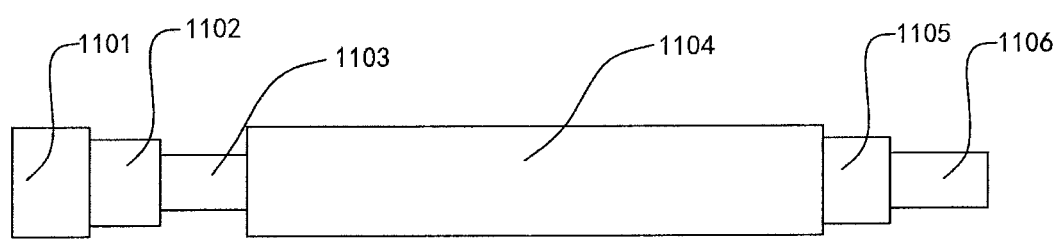
FIG. 6 is a schematic view of the support bracket according to an embodiment of the present disclosure.

As shown in FIG. 6, according to an embodiment of the present disclosure, each support rod 110 comprises a fixing portion 1101, a first engaging portion 1102, a second engaging portion 1103, a connecting portion 1104, a third engaging portion 1105 and a fourth engaging portion 1106 connected successively. According to an embodiment, the cross-section of the support rod 110 may be formed in a circular shape in which the outer diameter of the second engaging portion 1103 is smaller than the outer diameter of the first engaging portion 1102 and the outer diameter of the fourth engaging portion 1106 is smaller than the outer diameter of the third engaging portion 1105. It is to be understood that the cross-section of the support rod 110 may also be formed in other shapes, such as a square shape or an oval shape, and the present disclosure is not limited thereto.

According to an exemplary embodiment of the present disclosure, as shown in FIG. 1, the support bracket 11 is provided with a plurality of support projections 1107 extending in the position shifting direction and spaced apart in the upper and lower direction, and support projections 1107 on two adjacent support brackets 11 are aligned in the upper and lower direction one to one, so as to define the storage space. As an example, the support bracket may be formed as a plate-shaped support bracket, which may needs less driving devices to push the plate-shaped support bracket as a whole.

In the embodiment in which each support bracket 11 comprises the two support rods 110, each support rod 110 is provided with the plurality of support projections 1107 spaced apart in the upper and lower direction. The support projections 1107 on four support rods 110 of the two support brackets 11 are aligned one by one in the vertical direction, wherein each storage space is defined by the four support rods 110, and each sheet is horizontally placed on the support projections 1107 at the same height level of the four support rods 110.

Figure 7:
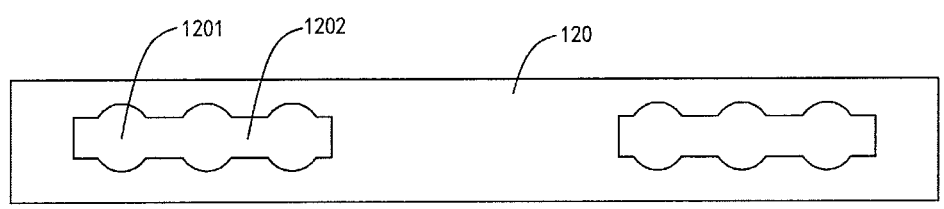
FIG. 7 is a schematic view of a shiftable mechanism according to an embodiment of the present disclosure.
Figure 8:
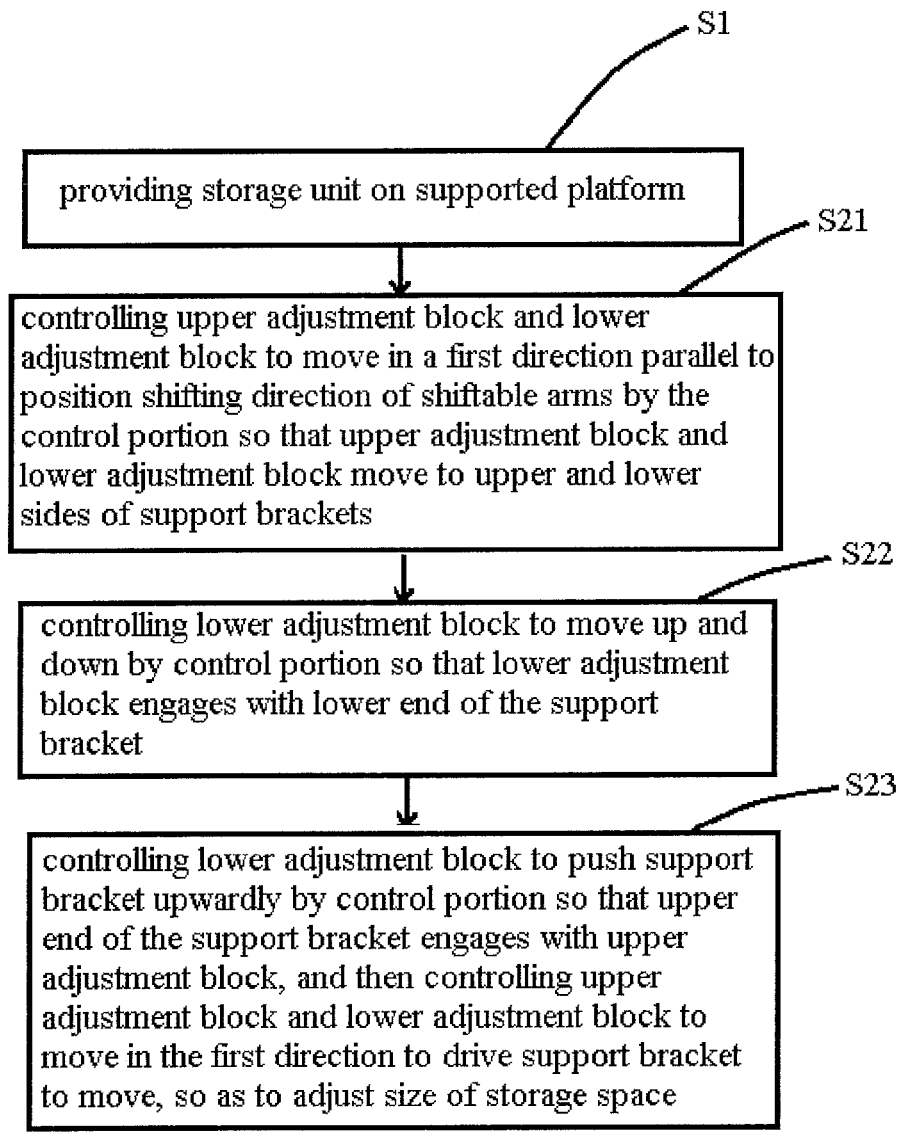
FIG. 8 is a flow chart of a method of controlling the sheet storage device according to an embodiment of the present disclosure.

According to an exemplary embodiment, the storage unit 1 further comprises the two shiftable mechanisms spaced apart in the upper and lower direction and adapted to be shiftably engaged to the upper and lower ends of the support brackets respectively to shift positions of the support brackets. According to an exemplary embodiment, each shiftable mechanism 12 may include two shiftable arms 120, which are spaced apart in the front and rear direction and extending the position shifting direction. In an embodiment, as shown in FIG. 7, each shiftable arm 120 is provided with a plurality of positioning holes 1201. For example, each shiftable arm 120 is provided with six positioning holes 1201. The shiftable arm 120 at an upper and front side of the storage unit 1 is aligned with the shiftable arm 120 at a lower and front side in the upper and lower direction, and the positioning holes 1201 thereof are also aligned in the upper and lower direction one by one. The shiftable arm 120 at an upper and rear side of the storage unit 1 is aligned with the shiftable arm 120 at a lower and rear side in the upper and lower direction, and the positioning holes thereof are also aligned in the upper and lower direction one by one.

A cross-section of each positioning hole 1201 may be formed in a circular shape. However, in other embodiments, the cross-section of the positioning hole 201 may also be formed in other shapes to be matched with the shape of a cross-section of the first engaging portion 1102 and the third engaging portion 1105 of the support rod 110. The first engaging portion 1102 and the third engaging portion 1105 of each support rod 110 are adapted to be received in two positioning holes 1201 of two shiftable arms 120 aligned in the upper and lower direction, respectively. Two adjacent positioning holes in each shiftable arm 120 are communicated through a communicating slot 1202. Communicating slots 1202 in the upper shiftable arm and communicating slots 1202 in the lower shiftable arm 120 are aligned one by one in the upper and lower direction. The width of the communication slots 1202 is smaller than the diameter of the positioning holes 1201. The second engaging portion 1103 and the fourth engaging portion 1106 of each support rod 110 are adapted to be movably engaged with the communicating slots 1202 in an upper shiftable arm 120 and a lower shiftable arm 120 respectively.

According to an exemplary embodiment, the first engaging portion 1102 and the third engaging portion 1105 are adapted to be engaged with positioning holes 1201 in the upper shiftable arm 120 and the lower shiftable arm 120 respectively. The fixing portion 1101 of each support rods 110, which has a larger outer diameter than that of the first engaging portion 1102, is supported on an upper side of the upper shiftable arm 120. According to an exemplary embodiment, the second engaging portion 1103 of each support rod 110 is also sleeved with a spring 3 positioned between the connecting portion 1104 and the upper shiftable arm 120, so as to keep the first engaging portion 1102 and the third engaging portion 1105 in the corresponding positioning holes 1201 to hold the support bracket in a fixed position.

When the size of the storage space needs to be adjusted, the first engaging portion 1102 and the third engaging portion 1105 of each support rod 110 may be disengaged from corresponding positioning holes 1201 in the upper shiftable arm 120 and the lower shiftable arm 120, respectively. The support rod 110 is moved so that the second engaging portion 1103 and the fourth engaging portion 1106 of each support rod 110 is movably engaged with corresponding communication slots 1202 in the upper shiftable arm 120 and the lower shiftable arm 120, respectively, so as to achieve movable engaging of each support bracket 11 and the two shiftable mechanisms 12. The spring 3 provided on the second engaging portion 1103 of each supporting rod 110 is limited between the connecting portion 1104 and the upper shiftable arm 120 so as to limit the position of the support rod 110. When the sheet storage device 100 is used to store sheets, the fixing portion 1101 of each support rod 110 is supported on the upper side of the upper straight shiftable arm 120, and the first engaging portion 1102 and the third engaging portion 1105 of each support rod 110 are engaged with two corresponding positioning holes 1201 in the two straight shiftable arms 120 to fix the position of the support bracket.

According to an exemplary embodiment, as shown in FIG. 1, the storage unit 1 may further include the mounting frame 13 to which both ends of the shiftable mechanism 12 are fixed, respectively. So that the structure of the sheet storage device 100 is more reliable and the stability of the sheet storage device 100 during adjusting of the size of the storage space is ensured.

According to an exemplary embodiment, the adjustment assembly 2 is engaged with at least one of the two adjacent support brackets 11 to adjust the size of the storage space. According to an exemplary embodiment, the adjustment assembly 2 comprises an upper adjustment block 21 configured to drive the support bracket 11 to move in a first direction parallel to the position shifting direction (for example, the left and right direction), and a lower adjustment block 22 configured to drive the support bracket 11 to move up and down. Optionally, the lower adjustment block 22 is also configured to drive the support bracket 11 to move in the first direction. The upper adjustment block 21 is formed with a first receiving recess 210 which is engaged with the upper end of the support bracket 11, and the lower adjustment block 22 is formed with a second receiving recess 220 which is engaged with the lower end of the support bracket 11. According to an exemplary embodiment, two first receiving recesses 210 and two second receiving recesses 220 are provided to engage with the upper and lower ends of the two supporting rods 110 on each support bracket 11, respectively. Cross-sections of first receiving recess 210 and the second receiving recess 220 may respectively be formed in a circular shape. In this way, when the support bracket is moved by the adjustment assembly, the upper end of the support bracket is received by the first receiving recesses, improving reliability of the position shifting of the sheet storage device. It can be seen that the structure of the receiving recess is simple and easy to manufacture.

According to an exemplary embodiment, the upper adjustment block 21 and the lower adjustment block 22 are located at the upper and lower sides of the support brackets 11, and the control portion 6 is configured to control the lower adjustment block 22 to engage with the lower end of the support bracket 11 and push the support bracket 11 upwardly so that the upper end of the support bracket is engaged with the upper adjustment block, and to control the upper adjustment block and/or the lower adjustment block to simultaneously drive the support bracket in the first direction to adjust the size of the storage space. The adjustment assembly has a simple structure and moves the support bracket according to user instructions to change the size of the storage space for storing the sheets of different sizes, thereby improving working efficiency for storing the sheets.

In this way, when the size of the storage space needs to be adjusted, the upper adjustment block 21 and the lower adjustment block 22 are located on upper and lower sides of the support bracket 11. The control portion controls the lower adjustment block 22 to engage with the lower end of the support bracket 11 and push the support bracket 11 upwardly so that the upper end of the support bracket 11 is engaged with the upper adjustment block 21, and to control the upper adjustment block 21 and/or the lower adjustment block 22 to move simultaneously in the first direction to drive the support bracket 11, so as to adjust the size of the storage space and to place sheets of different sizes. It is to be understood that the number of the adjustment assembly 2 may be the same as the number of the support brackets 11. When the size of the storage space needs to be adjusted, it is possible to move only one of the two adjacent support brackets 11, or both the two adjacent support brackets 11. It's also feasible to provide just one adjustment assembly 2. The one adjustment assembly 2 may be moved to the position of the storage unit to be adjusted and engaged with the support bracket to be moved, so as to shift the position of the support bracket.

According to an exemplary embodiment, the control portion is configured to control the adjustment assembly according to the received user instructions, thereby realizing automatic adjustment of the size of the sheet storage space. According to an exemplary embodiment, the sheet storage device includes a plurality of driving device connected to the control portion and the adjustment assembly 2, respectively. The driving device are configured to drive the upper adjustment block 21 and the lower adjustment block 22 to move according to the user instructions received from the control portion, so that automatic position shifting of the sheet storage device becomes more stable and reliable.

According to an exemplary embodiment, the plurality of driving devices comprises a first driving device 51 mounted on a lower portion of the mounting frame 13 and configured to cooperate with the lower adjustment block 22 to drive the first engaging portion 1102 and the third engaging portion 1105 of the support rod 110 to disengage from respective positioning holes 120; and a second driving device 52 mounted on an upper portion of the mounting frame 13 and configured to cooperate with the upper adjustment block 21 to drive the second engaging portion 1103 and the fourth engaging portion 1106 of the support rod to move in respective communication slots 1102 in the first direction.

According to an exemplary embodiment, the plurality of driving device further comprises a third driving device 53 mounted on a lower portion of the mounting frame and configured to cooperate with the lower adjustment block 22 and the second driving device 52, so as to drive the second engaging portion and the fourth engaging portion of the support rod to move in respective communication slots in the first direction. According to an exemplary embodiment, the above driving device comprises a motor, however, it should be understood that the driving device may comprise other driving mechanisms such as a hydraulic driving mechanism, a pneumatic driving mechanism or an electromagnetic coupling mechanism.

It will be understood that although the illustrated embodiment, the third driving device 53 is cooperated with the second driving device 52 to drive the second engaging portion and the fourth engaging portion of the support rod to move in respective communication slots in the first direction, synchronous movement of the upper adjustment block 21 and the lower adjustment block 22 may be realized by only one driving device via a transmission device.

Figure 2:
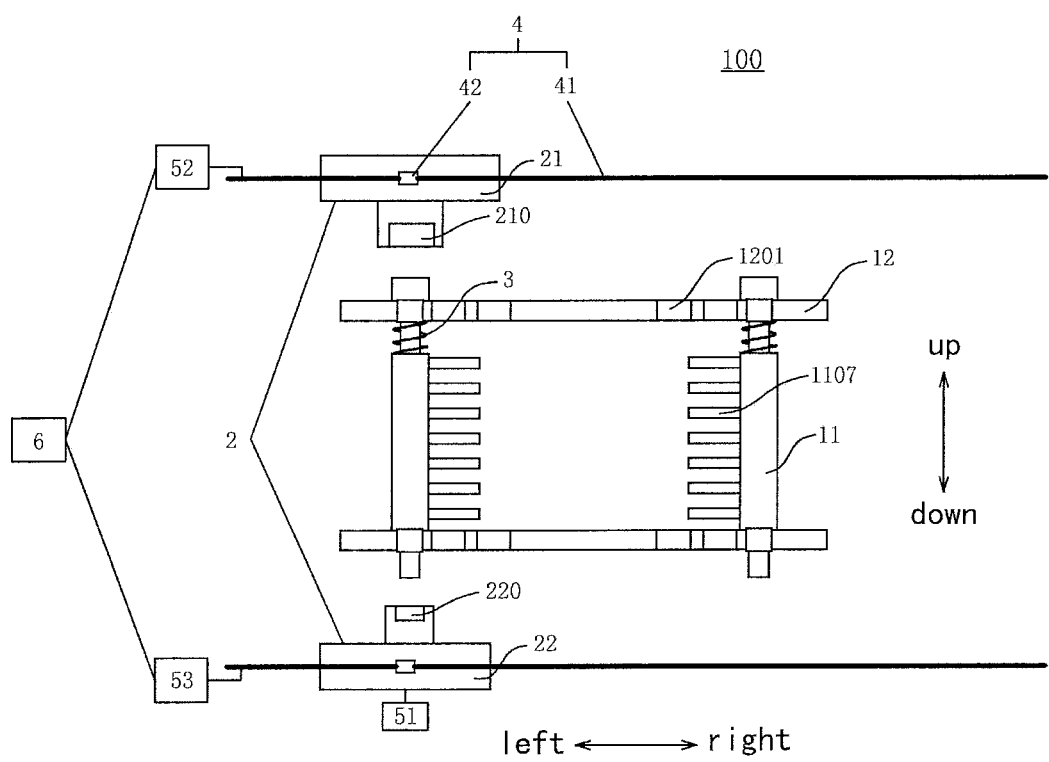
FIG. 2 is a schematic front view showing an operating principle of a sheet storage device according to an embodiment of the present disclosure.

According to an exemplary embodiment, the driving devices drive the adjustment assembly 2 via a transmission device 4. The transmission device may comprises, for example, a screw-nut assembly, a worm-gear assembly, or the like. According to an exemplary embodiment, as shown in FIG. 2, the transmission device comprises a screw-slider assembly. Two screws 41 are driven by two motors to rotate and to move the slider 42, thus the upper adjustment block 21 and the lower adjustment block 22 respectively connected to the respective sliders 42 are driven to move synchronously with the respective sliders 42. Since the upper adjustment block 21 and the lower adjustment block 22 are required to be moved synchronously, the control portion 6 is configured to control the two motors to rotate synchronously according to an exemplary embodiment. However, in other embodiments, only one motor may be used, and synchronous movement of the upper adjustment block 21 and the lower adjustment block 22 are achieved through a transmission device.

The upper adjustment block 21 and the lower adjustment block 22 of the adjustment assembly 2 are located on the upper and lower sides of the support bracket 11, respectively. Adjustment of the size of the storage space of the sheet storage device 100 may be achieved by shifting the position of the support bracket 11. When the size of the storage space is adjusted, the control portion 6 firstly receives instructions input from the instruction input device such as a control panel, a keyboard, or the like, then the control portion 6 drives the upper adjustment block 21 and the lower adjustment block 22 of the adjustment assembly 2 to move in the first direction parallel to the position shifting direction by the second and third driving devices, respectively, so that the upper adjustment block and the lower adjustment block are driven to move to the upper and lower sides of the support brackets. According to an embodiment, the upper adjustment block 21 and the lower adjustment block 22 each having two receiving recesses are located on the upper and lower sides of the two support rods 110 of the support bracket 11, respectively. Then, the control portion 6 drives the lower adjustment block 22 of the adjustment assembly 2 through the first driving device 51 to engage with the fourth engaging portion 1106 of each support rod 110 of the support bracket 11, so that the lower end faces of the fourth engaging portions 1106 are respectively abutted against bottom surfaces of the second receiving recesses 220; then the control portion 6 controls the first driving device 51 to drive the lower adjustment block 22 and the support bracket 11 to move upwardly so that the fixing portion 1101 of each support rod 110 of the support bracket 11 is engaged with the upper adjustment block 21, and the upper end faces of the two fixing portions 1101 are respectively abutted against the top end faces of the first receiving recesses 210. In this case, the first engaging portion 1102 and the third engaging portion 1105 of the support rod are disengaged from corresponding positioning holes 1201, respectively, the spring 3 is compressed, and the second engaging portion 1103 and the fourth engaging portion 1106 are partially located in corresponding positioning holes 1201. Since the width of the communication slots 1202 is slightly larger than the diameter of the second engaging portion 1103 and the fourth engaging portion 1106, the control portion may control the second and third driving devices to drive the second engaging portion 1103 and the fourth engaging portion 1106 of each support rod 110 of the support bracket 11 to slide along two aligned communicating slots 1102 in the two shiftable arms 120 to adjust the size of the storage space.

When the support bracket 11 is moved into the positioning hole 1201 at the position designated by the user, the control portion drive the lower adjustment block 22 of the adjustment assembly 2 by the first driving device 51 to move downwardly to be disengaged from the fourth engaging portion 1106, so that each support rods 110 moves downwardly, under the gravity and the urging force of the spring 3, to a position where the fixing portion 1101 of each supporting rod 110 is disengaged from the upper adjustment block 21 and the first engaging portion 1102 and the third engaging portion 1105 are moved into corresponding positioning holes 1201. In this way, the support bracket 11 may be firmly positioned at a desired fixed position, and adjusting of the size of the storage space of the sheet storage device 100 is completed. Thus, position shifting of the sheet storage device 100 is automatically performed, accidents due to manual operation are avoided, and reliability of the sheet storage device 100 is improved.

Figure 9:
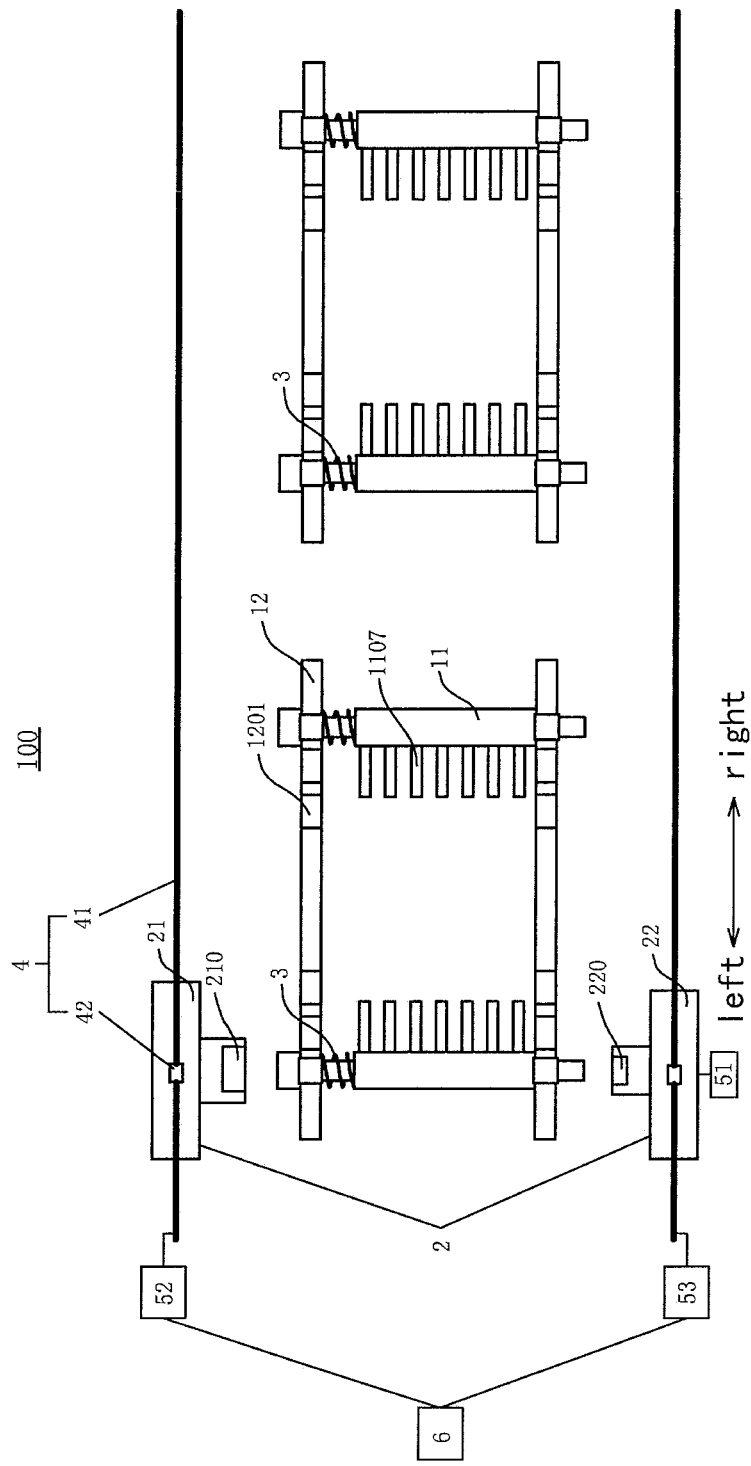
FIG. 9 is a schematic front view of the sheet storage device according to an exemplary embodiment of the present disclosure.

According to an exemplary embodiment of the present disclosure, as shown in FIG. 9, the sheet storage device may include a plurality of storage units which share the same set of adjustment assembly 2, the same control portion and the same set of driving devices. The adjustment assembly is controlled by the control portion to move the support bracket to a position to be adjusted, so as to achieve a required adjustment of the storage space.

As described above, the sheet storage device 100 according to the embodiments of the present disclosure has simple structure, high degree of automation, higher efficiency, and higher safety and reliability.

As shown in FIGS. 1-8, according to an exemplary embodiment of the present disclosure, there is provided a method of controlling the sheet storage device 100 according to any one of the above-described embodiments, and the control method includes the following steps:

S1: providing the storage unit 1 on the support platform; and

S2: controlling the adjustment assembly 2 to adjust the size of the storage space through the control portion.

The control method of the sheet storage device 100 according to embodiments of the present disclosure, position shifting of the sheet storage device 100 is automatically performed, work efficiency is improved, accidents due to manual operation are avoided, reliability of the sheet storage device 100 is improved, and quality problems of the sheet are avoided.

According to an exemplary embodiment of the present disclosure, the adjustment assembly 2 comprises an upper adjustment block 21 and a lower adjustment block 22, and step S2 comprises the steps of:

S21: controlling the upper adjustment block 21 and the lower adjustment block 22 to move in the first direction parallel to the position shifting direction of the shiftable mechanisms 12 by the control portion so that the upper adjustment block 21 and the lower adjustment block 22 are driven to move to the upper and lower sides of the support brackets 11;

S22: controlling the lower adjustment block 22 to move up and down by the control portion so that the lower adjustment block 22 is engaged with the lower end of the support bracket 11;

S23: controlling the lower adjustment block 22 to push the support bracket 11 upwardly by the control portion so that the upper end of the support bracket 11 is engaged with the upper adjustment block 21, and then controlling the upper adjustment block 21 and the lower adjustment block 22 to move in the first direction to drive the support bracket 11 to move, so as to adjust the size of the storage space. It can be seen that the method of adjusting the size of the storage space by the adjustment assembly is simple and easy to be performed.

Furthermore, the control portion moves the upper adjustment block 21 and the lower adjustment block 22 by the motor, so that the control method of the sheet storage device 100 is more reliable.

The operation of other embodiments of the sheet storage device 100 according to the present disclosure is known to those skilled in the art and will not be described in detail herein.

In the embodiments of the present disclosure, the term "control portion" may be implemented by one or more logic arithmetic processing circuits, which may be represented as a processor, for example, a central processing unit (CPU), or may be represented as a specific integrated circuit (Application Specific Integrated Circuit, referred to as ASIC), or as a digital signal processor (DSP), or as a Single-chip Microcomputer (MCU) and so on.

In the description of this specification, the description of the terms "one embodiment", "some embodiments", "illustrative embodiments", "examples", "exemplary examples", or "some examples" and the like means that specific features, structures, materials, or characteristics described in conjunction with the embodiments or examples are included in at least one embodiment or example of the present disclosure. In the present specification, the illustrative expression of the above terms does not necessarily refer to the same embodiment or example. Moreover, the specific features, structures, materials, or characteristics described may be combined in any suitable embodiment(s) or example(s) in any suitable manner.

Although several exemplary embodiments have been shown and described, the present disclosure is not limited to these embodiments and it would be appreciated by those skilled in the art that various changes or modifications may be made to these embodiments without departing from the principles and spirit of the disclosure, which should fall within the scope of the present disclosure. The scope of the disclosure is defined by the claims and their equivalents.

What is claimed is:

1. A sheet storage device, comprising:
   a storage unit comprising:
      a mounting frame;
      a plurality of support brackets configured to support a plurality of sheets; and
      two shiftable mechanisms mounted on the mounting frame and spaced apart in an upper and lower direction, wherein the plurality of support brackets are mounted between the two shiftable mechanisms and spaced apart in a position shifting direction of the two shiftable mechanisms, two adjacent support brackets thereof are constructed to define a storage space for placing the sheets, and each support bracket is configured such that upper and lower ends of the support bracket are adapted to be shiftably engaged with the two shiftable mechanisms respectively, so as to adjust the distance between the two adjacent support brackets;
   an adjustment assembly adapted to be engaged with at least one of two adjacent support brackets to adjust the size of the storage space; and
   a control portion connected to the adjustment assembly to control the adjustment assembly according to received user instructions;
   wherein the adjustment assembly comprises:
   an upper adjustment block configured to drive the at least one of the two adjacent support brackets to move in a first direction parallel to the position shifting direction; and
   a lower adjustment block configured to drive the at least one of the two adjacent support brackets to move up and down.

2. The sheet storage device according to claim 1, wherein the upper adjustment block and the lower adjustment block are located on upper and lower sides of the two adjacent support brackets, respectively, and
   the control portion is configured to control the lower adjustment block to be engaged with the lower end of the at least one of the two adjacent support brackets and to push the at least one of the two adjacent support brackets upwardly so that the upper end of the at least one of the two adjacent support brackets is engaged with the upper adjustment block, and to control the upper adjustment block and the lower adjustment block to simultaneously move the at least one of the two adjacent support brackets in the first direction to adjust the size of the storage space.

3. The sheet storage device according to claim 2, further comprising a plurality of driving devices configured to drive the upper adjustment block and the lower adjustment block to move, respectively, according to user instructions received from the control portion.

4. The sheet storage device according to claim 2, wherein the upper adjustment block is formed with a receiving recess which is engaged with the upper end of the at least one of the two adjacent support brackets.

5. The sheet storage device according to claim 2, wherein the lower adjustment block is formed with a receiving recess which is engaged with the lower end of the at least one of the two adjacent support brackets.

6. The sheet storage device according to claim 3, wherein each shiftable mechanism comprises two shiftable arms disposed to be spaced apart in a front and rear direction perpendicular to the position shifting direction; and
   wherein each support bracket comprises two support rods disposed to be spaced apart in the front and rear direction, and upper and lower ends of each support rod are respectively shiftably engaged with corresponding upper and lower shiftable arms.

7. The sheet storage device according to claim 6, wherein each of the shiftable arms is formed with a plurality of positioning holes, two adjacent positioning holes being communicated with each other through a communicating slot, the width of the communication slot being smaller than the diameter of the positioning holes, and positioning holes in two shiftable arms being aligned in the upper and lower direction one to one.

8. The sheet storage device according to claim 7, wherein each support rod comprises a first engaging portion, a second engaging portion, a connecting portion, a third engaging portion and a fourth engaging portion connected successively, the first engaging portion and the third engaging portion being adapted to be engaged with two positioning holes in the two shiftable arms aligned in the upper and lower direction respectively, so as to hold the support bracket in a fixed position, and the second engaging portion and the fourth engaging portion being adapted to slide through communicating slots in the two shiftable arms aligned in the upper and lower direction respectively, so as to shift positions of the support bracket.

9. The sheet storage device according to claim 8, wherein the plurality of driving devices comprise:
a first driving device mounted on a lower portion of the mounting frame and configured to cooperate with the lower adjustment block to drive the first engaging portion and the third engaging portion of the support rod to disengage from respective positioning holes; and
a second driving device mounted on an upper portion of the mounting frame and configured to cooperate with the upper adjustment block to drive the second engaging portion and the fourth engaging portion of the support rod to move in respective communication slots in the first direction.

10. The sheet storage device according to claim 9, wherein the plurality of driving devices further comprise:
a third driving device mounted on a lower portion of the mounting frame and configured to cooperate with the lower adjustment block and the second driving device, so as to drive the second engaging portion and the fourth engaging portion of the support rod to move in respective communication slots in the first direction.

11. The sheet storage device according to claim 10, wherein each of the first driving device, the second driving device and the third driving device comprises a motor, a pneumatic driving mechanism, or an electromagnetic coupling mechanism mounted on the mounting frame.

12. A method of controlling the sheet storage device according to claim 1, comprising the steps of:
providing the storage unit; and
controlling the adjustment assembly to adjust the size of the storage space through the control portion.

13. The method according to claim 12, wherein the adjustment assembly comprises an upper adjustment block and a lower adjustment block, and the step of controlling the adjustment assembly to adjust the size of the storage space through the control portion comprises the following steps:
controlling the upper adjustment block and the lower adjustment block to move in a first direction parallel to the position shifting direction by the control portion so that the upper adjustment block and the lower adjustment block move to the upper and lower sides of the support brackets;
controlling the lower adjustment block to move up and down by the control portion so that the lower adjustment block is engaged with the lower end of the support bracket;
controlling the lower adjustment block to push the support bracket upwardly by the control portion so that the upper end of the support bracket is engaged with the upper adjustment block, and then controlling the upper adjustment block and the lower adjustment block to move in the first direction to drive the support bracket to move, so as to adjust the size of the storage space.

14. The method according to claim 12, wherein the control portion drives the upper adjustment block and the lower adjustment block by a driving device.

* * * * *